United States Patent
Velev et al.

(10) Patent No.: US 11,197,341 B2
(45) Date of Patent: Dec. 7, 2021

(54) INDICATING A PACKET DATA UNIT SESSION AS UNAVAILABLE

(71) Applicant: Lenovo (Singapore) Pte. Ltd., New Tech Park (SG)

(72) Inventors: Genadi Velev, Darmstadt (DE); Dimitrios Karampatsis, Ruislip (GB)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 185 days.

(21) Appl. No.: 16/610,059

(22) PCT Filed: Aug. 16, 2017

(86) PCT No.: PCT/EP2017/070764
§ 371 (c)(1),
(2) Date: Oct. 31, 2019

(87) PCT Pub. No.: WO2019/034249
PCT Pub. Date: Feb. 21, 2019

(65) Prior Publication Data
US 2020/0059989 A1    Feb. 20, 2020

(51) Int. Cl.
*H04W 76/30* (2018.01)
*H04W 8/08* (2009.01)

(52) U.S. Cl.
CPC ............. *H04W 76/30* (2018.02); *H04W 8/08* (2013.01)

(58) Field of Classification Search
CPC ....... H04W 36/12; H04W 8/08; H04W 76/30; H04W 76/32
See application file for complete search history.

(56) References Cited

U.S. PATENT DOCUMENTS

2021/0076192 A1* 3/2021 Wu .................... H04L 67/22
2021/0204207 A1* 7/2021 Fiorese ................ H04W 8/08

OTHER PUBLICATIONS

Patent Cooperation Treaty, "Notification of Transmittal of the ISR and the Written Opinion of the International Searching Authority, or the Declaration", PCT/EP2017/070764, dated Apr. 18, 2018, pp. 1-10.
Patent Cooperation Treaty, "International Search Report", PCT/EP2017/070764, dated Apr. 18, 2018, p. 1-3.
Patent Cooperation Treaty, "Written Opinion of the International Searching Authority", PCT/EP2017/070764, pp. 1-5.
QUALCOMM, "TS 23.501: Support for slice co-existence", SA WG2 Meeting #122bis, Aug. 21-25, 2017, pp. 1-10.
Samsung, "TS 23.501: Rejected Slices", SA WG2 Meeting #122bis, Aug. 21-25, 2017, pp. 1-4.
Samsung, "TS 23.501: for homogeneous network slice support within RA", SAWG2 Meeting #122Bis, Aug. 21-25, 2017, pp. 1-8.
3GPP, 3rd Generation Partnership Project; Technical Specification Group Services and System Aspectes; System Architecture for the 5G System; Stage 2 (Release 15), 3GPP TS 23.501 V1.2.0, Jul. 2017, pp. 1-166.

* cited by examiner

*Primary Examiner* — Kyaw Z Soe
(74) *Attorney, Agent, or Firm* — Kunzler Bean & Adamson

(57) ABSTRACT

Apparatuses, methods, and systems are disclosed for indicating a packet data unit session as unavailable. One apparatus (300) includes a processor (302) that determines (802) that at least one packet data unit session is unavailable. The apparatus (300) includes a transmitter (310) that transmits (804) information indicating that the at least one packet data unit session is to be released.

20 Claims, 9 Drawing Sheets

INDICATING A PACKET DATA UNIT SESSION AS UNAVAILABLE

FIELD

The subject matter disclosed herein relates generally to wireless communications and more particularly relates to indicating a packet data unit session as unavailable.

BACKGROUND

The following abbreviations are herewith defined, at least some of which are referred to within the following description: Third Generation Partnership Project ("3GPP"), Positive-Acknowledgment ("ACK"), Core Access and Mobility Management Function ("AMF"), Base Station ("BS"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Data Radio Bearer ("DRB"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced LTE ("eLTE"), Enhanced Mobile Broadband ("eMBB"), Evolved Node B ("eNB"), Evolved Packet Core ("EPC"), European Telecommunications Standards Institute ("ETSI"), Evolved, Universal Terrestrial Radio Access ("E-UTRA"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Globally Unique Temporary UE Identity ("GUTI"), Hybrid Automatic Repeat Request ("HARQ"), Home Location Register ("HLR"), Home Subscriber Server ("HSS"), Identity ("ID"), International Mobile Subscriber Identity ("IMSI"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Mobility Management Entity ("MME"), Modulation Coding Scheme ("MCS"), Machine Type Communication ("MTC"), Multiple Input Multiple Output ("MIMO"), Multi User Shared Access ("MUSA"), Non Access Stratum ("NAS"), Narrowband ("NB"), Negative-Acknowledgment ("NACK") or ("NAK"), Network Exposure Function ("NEF"), Next Generation Node B or 5G Node B ("gNB"), New Radio ("NR"), Network Slice Selection Assistance Information ("NSSAI"), Network Slice Instance ("NSI"), Network Slice Selection Function ("NSSF"), Non-Orthogonal Multiple Access ("NOMA"), Operation and Maintenance System ("OAM"), Orthogonal Frequency Division Multiplexing ("OFDM"), Primary Cell ("PCell"), Physical Broadcast Channel ("PBCH"), Policy Control Function ("PCF"), Physical Downlink Control Channel ("PDCCH"), Physical Downlink Shared Channel ("PDSCH"), Pattern Division Multiple Access ("PDMA"), Packet Data Unit ("PDU"), Physical Hybrid ARQ Indicator Channel ("PHICH"), Public Land Mobile Network ("PLMN"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Access Network ("RAN"), Radio Resource Control ("RRC"), Random Access Procedure ("RACH"), Random Access Response ("RAR"), Radio Network Temporary Identifier ("RNTI"), Reference Signal ("RS"), Registration Area ("RA"), Remaining Minimum System Information ("RMSI"), Resource Spread Multiple Access ("RSMA"), Round Trip Time ("RTT"), Receive ("RX"), Single Network Slice Selection Assistance Information ("S-NSSAI"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Session Management Function ("SMF"), Synchronization Signal ("SS"), Tracking Area ("TA"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Unified Data Management ("UDM"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), User Plane ("UP"), User Plane Function ("UPF"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a remote unit may physically move to an area that makes certain PDU sessions unavailable. In such networks, the unavailable PDU sessions may not be released.

BRIEF SUMMARY

Apparatuses for indicating a packet data unit session as unavailable are disclosed. Methods and systems also perform the functions of the apparatus. In one embodiment, the apparatus includes a processor that determines that at least one packet data unit session is unavailable. In various embodiments, the apparatus includes a transmitter that transmits information indicating that the at least one packet data unit session is to be released.

In one embodiment, the processor determines whether a network function is able to communicate with a session management function used for the at least one packet data unit session. In a further embodiment, in response to determining that the network function is able to communicate with the session management function, the transmitter transmits the information indicating that the at least one packet data unit session is to be released, and the information indicates to release the at least one packet data unit session. In certain embodiments, the information indicates that the at least one packet data unit session is to be released without notifying a corresponding remote unit. In various embodiments, the information indicates that the at least one packet data unit session is to be released with notification given to a corresponding remote unit. In some embodiments, in response to determining that the network function is unable to communicate with the session management function, the transmitter transmits the information indicating that the at least one packet data unit session is unavailable to a prior network function. In certain embodiments, the information indicates an identification of the at least one packet data unit session.

In various embodiments, the information indicates that the prior network function is to release the at least one packet data unit session. In some embodiments, the prior network function determines based on the information whether to initiate release of the at least one packet data unit session. In certain embodiments, the prior network function communicates with the session management function to release the at least one packet data unit session, and the at least one packet data unit session is released without providing notification to a remote unit corresponding to the at least one packet data unit session. In one embodiment, the apparatus includes a receiver that receives feedback indicating that the prior network function released the at least one packet data unit session. In various embodiments, the transmitter transmits a message to a remote unit indicating enabled network slice selection assistance information. In some embodiments, the transmitter transmits a message to a remote unit indicating available packet data unit sessions.

A method for indicating a packet data unit session as unavailable, in one embodiment, includes determining that at least one packet data unit session is unavailable. In various embodiments, the method includes transmitting information indicating that the at least one packet data unit session is to be released.

An apparatus for indicating a packet data unit session as unavailable, in one embodiment, includes a receiver that receives information indicating to release at least one packet data unit session. In various embodiments, the apparatus includes a processor that: determines whether to send explicit signaling to a remote unit for releasing the at least one packet data unit session; and releases the at least one packet data unit session in response to receiving the information.

In one embodiment, the apparatus includes a transmitter that transmits feedback indicating that the at least one packet data unit session is released. In a further embodiment, the apparatus includes a transmitter that transmits a message to the remote unit indicating that the at least one packet data unit session is released.

A method for indicating a packet data unit session as unavailable, in one embodiment, includes receiving information indicating to release at least one packet data unit session. In various embodiments, the method includes determining whether to send explicit signaling to a remote unit for releasing the at least one packet data unit session. In certain embodiments, the method includes releasing the at least one packet data unit session in response to receiving the information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
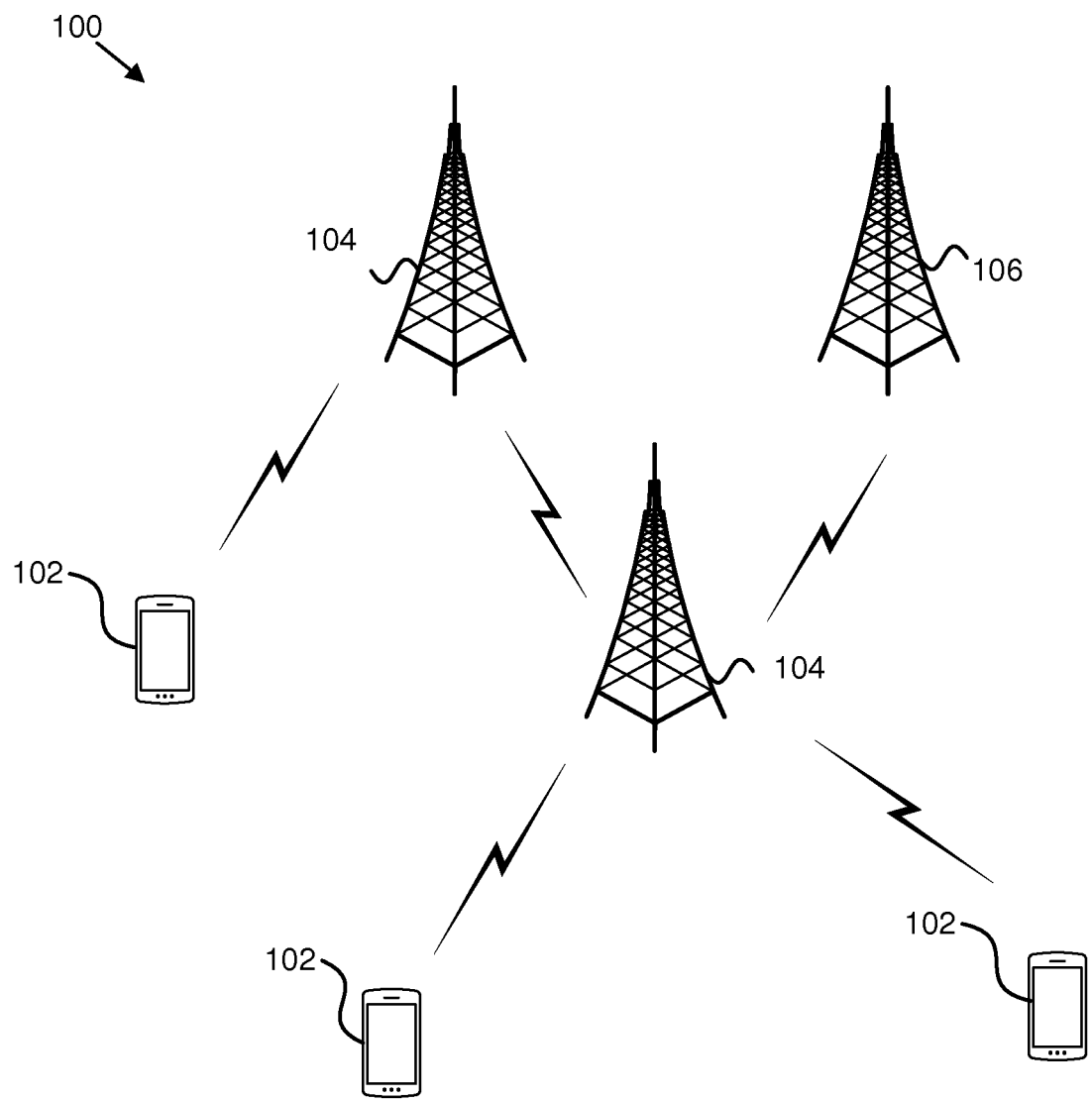
FIG. 1 is a schematic block diagram illustrating one embodiment of a wireless communication system for indicating packet data unit sessions as unavailable.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for indicating packet data unit sessions as unavailable. In one embodiment, the wireless communication system 100 includes remote units 102, base units 104, and a network function 106. Even though a specific number of remote units 102, base units 104, and network functions 106 are depicted in FIG. 1, one of skill in the art will recognize that any number of remote units 102, base units 104, and network functions 106 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network (e.g., EPC, 5GC), an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, the base unit 104 may include a RAN (e.g., 4G-RAN such as E-UTRA, 5G-RAN such as eLTE or NR). In certain embodiments, the network function 106 may include an MME, an AMF, a UPF, and/or an SMF.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a network function 106 (e.g., AMF) may determine that at least one packet data unit session is unavailable. In various embodiments, the network function 106 may transmit information indicating that the at least one packet data unit session is to be released. Accordingly, a network function 106 may be used for indicating packet data unit sessions as unavailable.

In one embodiment, a network function 106 (e.g., SMF) may receive information indicating to release at least one packet data unit session. In various embodiments, the network function 106 may determine whether to send explicit signaling to a remote unit 102 for releasing the at least one packet data unit session. In certain embodiments, the network function 106 may release the at least one packet data unit session in response to receiving the information. Accordingly, a network function 106 may be used for indicating packet data unit sessions as unavailable.

Figure 2:
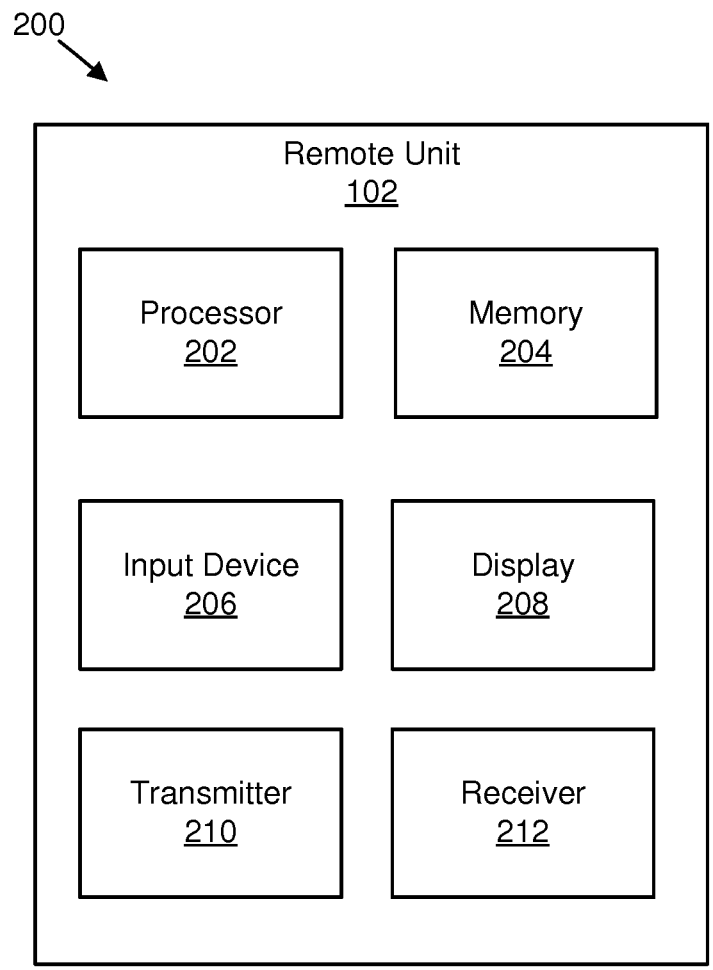
FIG. 2 is a schematic block diagram illustrating one embodiment of an apparatus that may be used for receiving an indication that packet data unit sessions are unavailable.

FIG. 2 depicts one embodiment of an apparatus 200 that may be used for receiving an indication that packet data unit sessions are unavailable. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
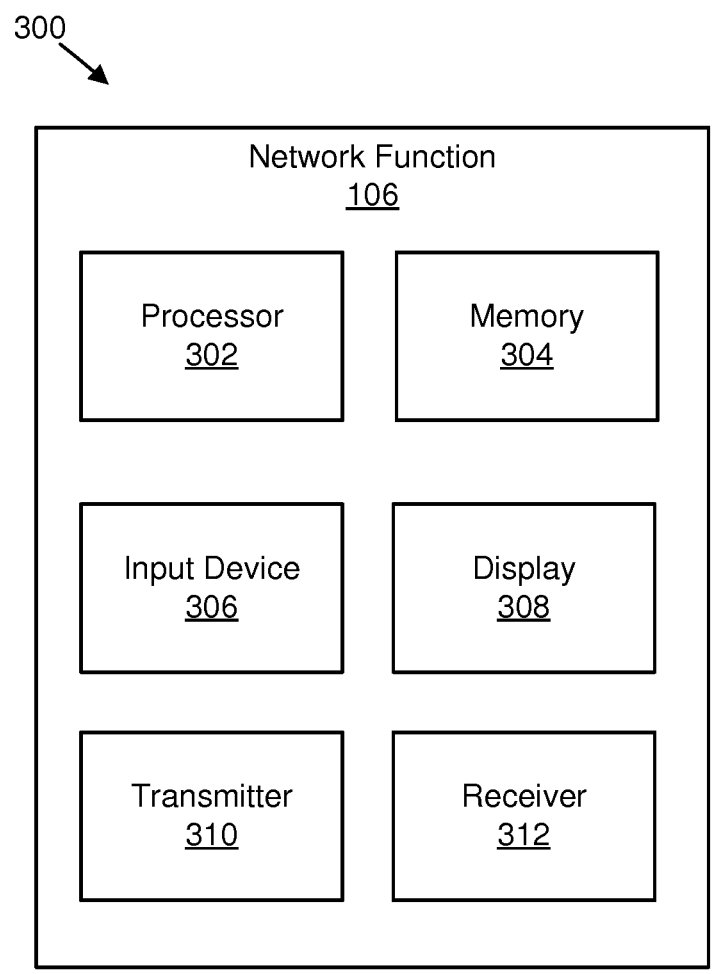
FIG. 3 is a schematic block diagram illustrating one embodiment of an apparatus that may be used for indicating packet data unit sessions as unavailable.

FIG. 3 depicts one embodiment of an apparatus 300 that may be used for indicating packet data unit sessions as unavailable. The apparatus 300 includes one embodiment of the network function 106. Furthermore, the network function 106 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the processor 302 may determine that at least one packet data unit session is unavailable. In various embodiments, the transmitter 310 may transmit information indicating that the at least one packet data unit session is to be released. In various embodiments, the receiver 312 may receive information indicating to release at least one packet data unit session. In various embodiments, the processor 302 may determine whether to send explicit signaling to a remote unit for releasing the at least one packet data unit session. In certain embodiments, the processor 302 may release the at least one packet data unit session in response to receiving the information. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
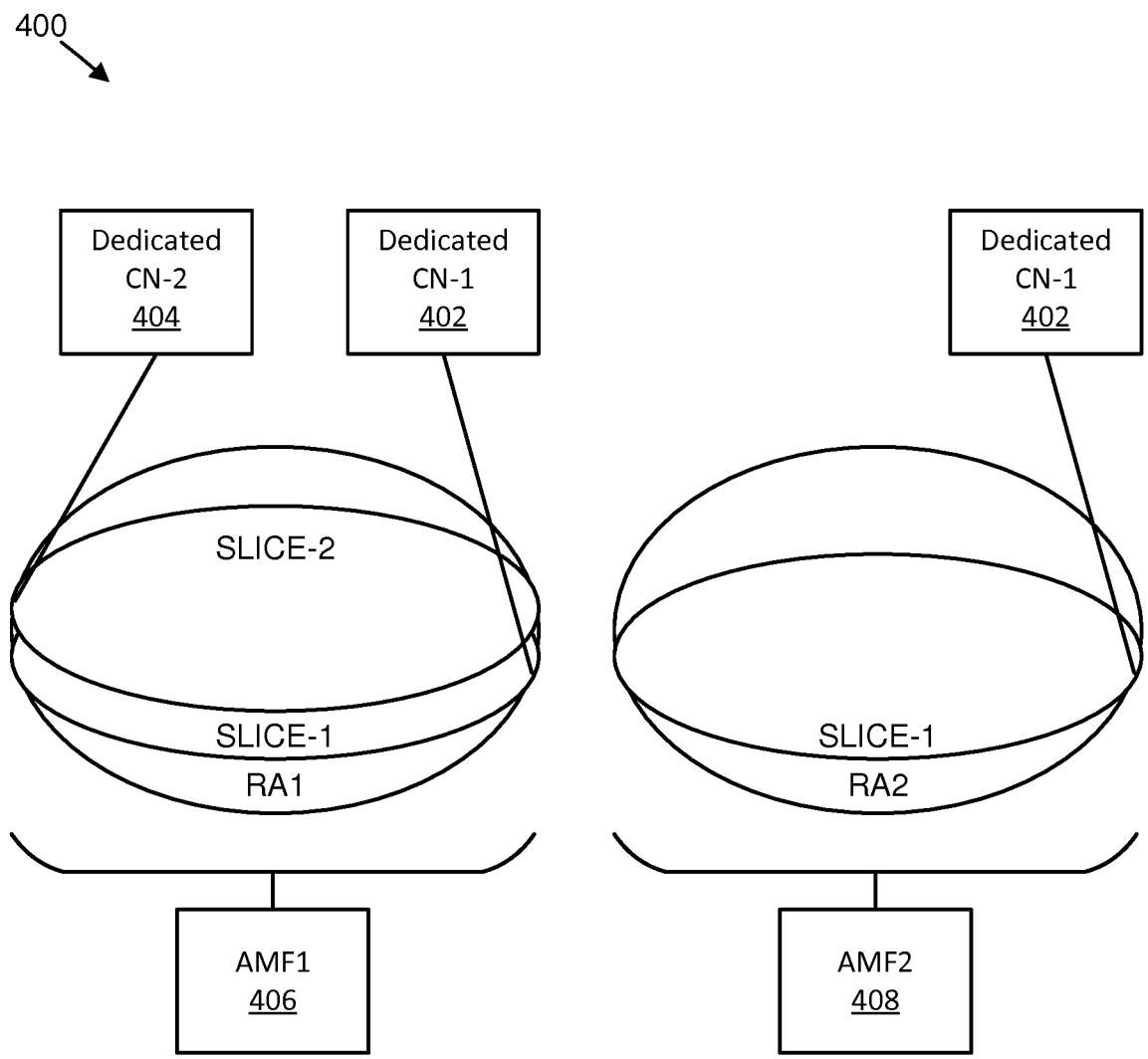
FIG. 4 is a schematic block diagram illustrating one embodiment of network availability.

FIG. 4 is a schematic block diagram illustrating one embodiment of network 400 availability. Specifically FIG. 4 illustrates one embodiment of a UE's RAa and the availability of network slices. In RA1, a UE may be associated with Slice-1 and Slice-2. Moreover, Slice-1 may use dedicated core network functions grouped and denoted as dedicated CN-1 402. Similarly, Slice-2 may use dedicated core network functions grouped and denoted as dedicated CN-2 404. Furthermore, RA1 may have a connection to AMF1 406. In RA2, only Slice-1 is available, and RA2 may have a connection to AMF2 408. If the UE moves from RA1 to RA2, the PDU sessions established with Slice-2 may need to be released, but there may be no connection between the AMF2 408 and the dedicated CN-2 404, so a PDU session release procedure may not be able to be performed.

It should be noted that while PDU sessions are described herein, any of the methods described herein may be applied to any kind of sessions and/or connections (e.g., PDN connection) in a mobile network and/or a fixed network.

Furthermore, different mobility events (e.g., mobility in CM-IDLE state, mobility in CM-CONNECTED state) are described herein; however, the methods described herein are not limited to these mobility events, but may be applied to any change of network slices associated with a UE.

In certain embodiments, a UE may change from one registration area (e.g., old RA) to a new registration area (e.g., new RA). In such embodiments, the network (e.g. AMF) may determine that the network slices used by the UE need to be changed. More specifically, the network may determine that already used network slice cannot be used anymore (e.g., one or more network slices become unavailable). In various embodiments, the network (e.g., AMF that determines the change of network slices) further determines whether the AMF (either new or serving) can contact the network functions (e.g., SMF) from the unavailable network slice (or network slice instances). In such embodiments, the AMF may determine whether existing related PDU sessions need to be released autonomously in the SMF, UPF, and/or PCF, or whether the PDU session release can be performed with explicit N1 session management ("SM") signaling. In certain embodiments, the network (e.g., AMF) may determine that it is not possible to send and/or receive N1 SM signaling between the UE and dedicated slice NF (e.g., SMF) anymore (e.g., the UE is unreachable for this network slice). In such embodiments, the network (e.g., AMF) informs entities from the unavailable network slice instance about the inability to be used for the particular UE, resulting in implicitly deleting the UE's SM context in the entities of the unavailable network slice.

In some embodiments, if a network slice instance ("NSI") used for one or multiple PDU sessions is no longer available, the network (e.g., AMF) may determine whether SM information can be exchanged between the network (e.g., SMF) and the UE. In such embodiments, the following may apply: if N1 SM information can be exchanged, the network initiates a network-triggered PDU session release procedure with an appropriate cause value for the impacted PDU sessions; or if N1 SM information cannot be exchanged (e.g., a new AMF is not a part of the network slice instances for the no longer available network slices), or the UE is in IDLE state (i.e., there is no need to page the UE in order to exchange N1 SM signaling), the serving AMF initiates autonomous release of the UE's SM context in the SMF, UPF, and/or PCF. In such embodiments, the new AMF may indicate to the old AMF which S-NSSAI or which PDU sessions cannot be served any longer. Moreover, the old AMF may inform the corresponding SMFs to autonomously release the UE's SM context. Furthermore, the PDU sessions context may be implicitly released in the UE after receiving allowed NSSAI in a registration accept message.

Figure 5:
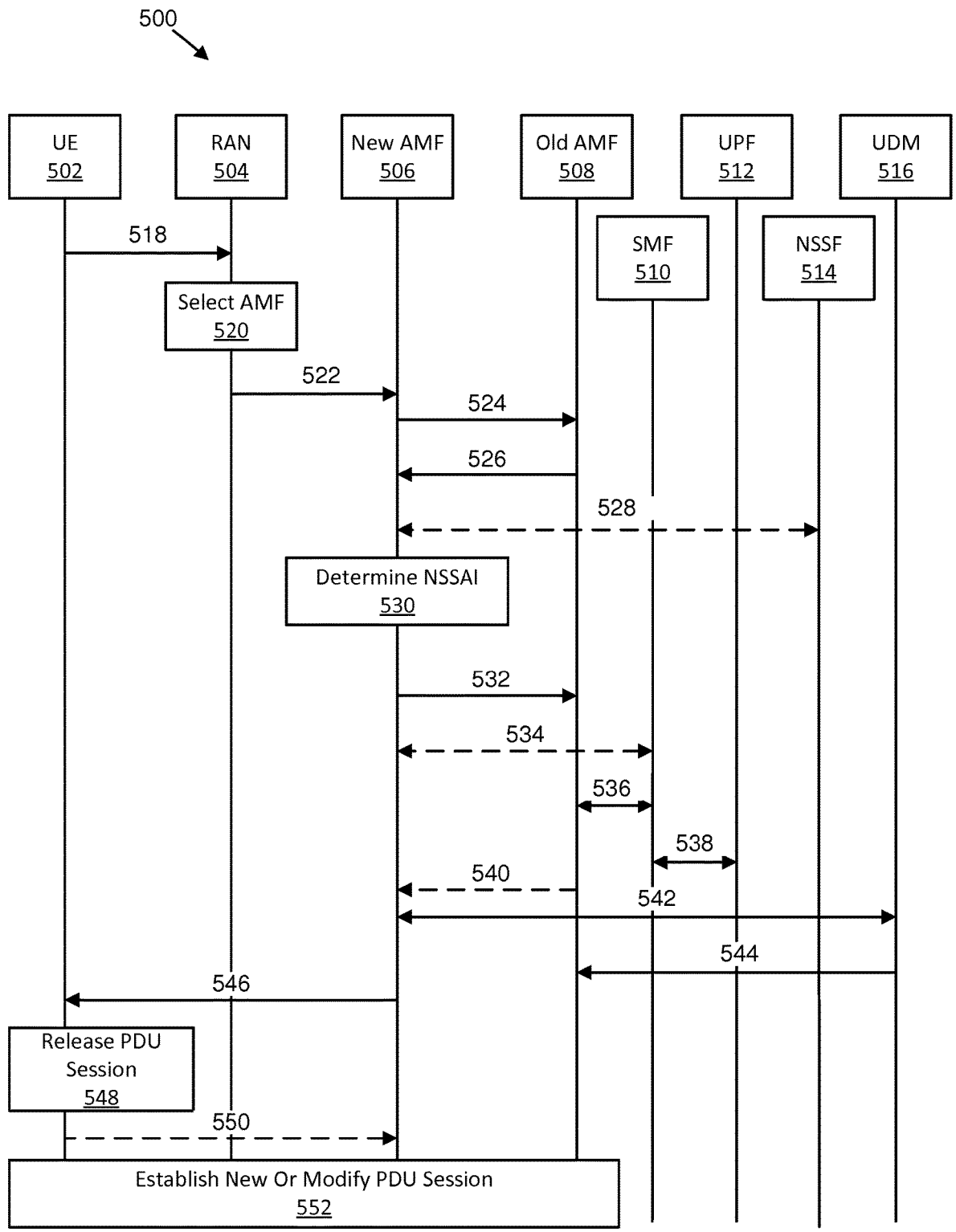
FIG. 5 is a schematic block diagram illustrating one embodiment of communications to facilitate indicating packet data unit sessions as unavailable.

FIG. 5 is a schematic block diagram illustrating one embodiment of communications 500 to facilitate indicating packet data unit sessions as unavailable. Specifically, FIG. 5 shows one embodiment of communications 500 applied to a UE in CM-IDLE state performing a registration procedure due to mobility. Moreover, in the illustrated embodiment, it is assumed that the registration procedure results in an AMF change. It should be noted that the terms "new AMF" and "target AMF" (e.g., T-AMF) mean the same thing. Similarly, the terms "old AMF" and "source AMF" (e.g., S-AMF) mean the same thing. In various embodiments, if SMF and/or UPF relocation is needed during a mobility procedure, the SMF and/or UPF relocation may be performed by a session and service continuity ("SSC") mechanism.

The communications 500 include communication between a UE 502, a RAN 504, a new AMF 506, an old AMF 508, an SMF 510, a UPF 512, an NSSF 514, and a UDM 516. However, in other embodiments, the communications may be between different devices.

In certain embodiments, a first communication 518 transmitted from the UE 502 to the RAN 504 may include an NAS registration request message. In various embodiments, the NAS registration request message may include a UE ID, a registration type (e.g., mobility type), and/or a requested NSSAI. In one embodiment, the NAS registration request message may be transmitted by RRC signaling. In such embodiments, the RRC signaling may include a requested NSSAI.

In some embodiments, the RAN 504 may select 520 an AMF by performing an AMF selection procedure based on a RRC UE ID and requested NSSAI. In such embodiments, it may be assumed that the RAN 504 cannot reach the old AMF 508, so the RAN 504 performs a new AMF selection considering the requested NSSAI parameter sent from the UE 502.

In some embodiments, a second communication 522 transmitted from the RAN 504 to the new AMF 506 may include a forwarding of the NAS registration request message to the selected new AMF 506.

In various embodiments, a third communication 524 transmitted from the new AMF 506 to the old AMF 508 may include the new AMF 506 retrieving the UE's 502 context from the old AMF 508. In certain embodiments, if the UE 502 has used the UE temporary ID (e.g. GUTI) in the registration request message, the new AMF 506 uses the GUTI to select the old AMF 508. In some embodiments, the new AMF 506 may forward the complete registration request message to the old AMF 508. In various embodiments, the third communication 524 may include an information request message and/or a UE context request message.

In certain embodiments, a fourth communication 526 transmitted from the old AMF 508 to the new AMF 506 may include the old AMF 508 sending the UE's context to the new AMF 506 (e.g., using an information response message or a UE context response message). In various embodiments, the UE's context may include a global UE subscription ID (e.g., subscriber permanent identifier ("SUPI"), a UE mobility management ("MM") context (e.g., allowed NSSAI in the old registration area, mobility restrictions, UE capabilities, etc.), and/or SMF information. In certain embodiments. SMF information may include UE session related context (e.g., PDU session IDs and corresponding S-NSSAIs and SMF IDs). In various embodiments, the new AMF 506 may verify whether the requested NSSAI are permitted based on the subscribed NSSAI from the UE's context.

In some embodiments, a fifth communication 528 (optional communication) includes one or more messages transmitted between the new AMF 506 and the NSSF 514. In certain embodiments, if the new AMF 506 determines (e.g., based on network configuration and policies) that it can serve the UE 502 (e.g., it can serve all S-NSSAIs from the requested NSSAI), the new AMF 506 may compose allowed NSSAI and skip communications 530 through 542. In various embodiments, if the new AMF 506 determines that it may not serve all S-NSSAIs from the requested NSSAI based on AMF-internal configuration, the new AMF 506 may query the NSSF for network slice instance ("NSi" or "NSI") resolution.

In certain embodiments, the new AMF 506 may determine 530 NSSAI. In various embodiments, the new AMF 506 may determine 530 (based on existing UE context, internal configuration, and/or on information exchanged with the NSSF) that for one or more S-NSSAI from the requested NSSAI there is no corresponding available NSi. In some embodiments, the reason for unavailable NSi may be: NSi unavailable in the new registration area; the slice (characterize by the S-NSSAI) is available in the new registration area, but require a different AMF (meaning that some S-NSSAIs of the Requested NSSAI are not co-existing); or the S-NSSAI is not available at this time of day, etc. In certain embodiments, a particular S-NSSAI may be temporary rejected. In various embodiments, the new AMF 506 may determine the allowed NSSAI in the current registration area. In such embodiments, the allowed NSSAI may include a subset of the allowed NSSAI in the old registration area. Moreover, the new AMF 506 may compare the allowed NSSAI in the new RA with the S-NSSAIs (and corresponding PDU Sessions) used in the old RA. In some embodiments, if the new AMF 506 determines that one or more of the S-NSSAIs used in the old RA are not available in the new RA, the new AMF 506 may initiate signaling to indicate autonomous release of UE's SM context in the corresponding SMFs.

In certain embodiments, if the new AMF 506 can reach one or more SMFs used for the one or more PDU sessions associated with the unavailable S-NSSAI, the new AMF 506 may initiate procedures to these one or more SMFs to release the UE's context in the SMF autonomously (e.g., the SMF does not need to perform a PDU session release procedure with the UE). In certain embodiments, the new AMF 506 may initiate an N11 release request procedure for the concerned PDU session with an indication for implicit release. In such embodiments, after receiving the request from the new AMF 506, the SMF may delete the UE's PDU session context and the related states in the UPF autonomously (e.g., allocated IP address and/or prefixes) without sending N1 SM information to the UE (e.g., PDU session release request or PDU session release command). In various embodiments, if the new AMF 506 cannot reach the one or more SMFs used for the one or more PDU sessions associated with the unavailable S-NSSAI, the new AMF 506 may include the communications 532 through 543. In some embodiments, if the slice co-existence rules are not met by the S-NSSAI from the requested NSSAI, then the new AMF 506 may provide in a registration accept message: an error indication that incompatible S-NSSAIs were included in the requested NSSAI; network slices coexistence information for each one of the subscribed S-NSSAIs in the PLMN; and/or the allowed NSSAI for this registration area optionally the available S-NSSAIs.

In various embodiments, a sixth communication 532 transmitted from the new AMF 506 to the old AMF 508 may include a registration complete notify message. In one embodiment, if the new AMF 506 determines that one or more of the S-NSSAIs used in the previous RA (e.g., in the old RA) cannot be served currently (e.g., in the current RA), the new AMF 506 determines that established PDU sessions cannot be supported in the new RA. In such an embodiment, the new AMF 506 may determine based on its configuration that it is not able to directly reach the SMF 510 from the network slice instance which is not any more available. For example, the new AMF 506 may be configured to be a part of a list of NSIs it serves and the new AMF 506 may determine that the SMF's 510 NSI (as per unavailable S-NSSAI) is not part of the new AMF's 506 NSI list. Accordingly, in the sixth communication 532, the new AMF 506 may initiate a procedure (e.g., an existing registration complete notify message or a new notification message) towards the old AMF 508 to indicate that particular PDU sessions (e.g., characterized by PDU session IDs) and/or particular corresponding S-NSSAI) cannot be served in the current and/or target registration area. Furthermore, the new AMF 506 may indicate to the old AMF 508 that the PDU sessions need to be released and/or deleted autonomously via communication between the old AMF 508 and the SMF 510 and/or UPF 512. In some embodiments, the sixth communication 532 may be implemented as a protocol message (e.g., based on interface signaling exchange) or as invoking a service operation offered by the new AMF 506 (e.g., based on service based architecture "SBA"). In various embodiments, the following implementations may be used: an N14 registration complete notify message (including a cause); an N11 session release request message (e.g., including: PDU session ID for release, unavailable S-NSSAI, release cause, release type, and/or autonomous indicator) per PDU session to be released; a slice release request message (e.g., including: unavailable S-NSSAI, PDU session ID, and/or release cause) per S-NSSAI which is unavailable in the current RA; and/or Namf_Communication_RegistrationCompleteNotify service operation (e.g., including: UE 502 ID and/or cause). In certain embodiments, the "cause," "release cause," "Release Type" value of the above messages may indicate that the PDU sessions need to be released and/or deleted autonomously towards the related SMFs, UPFs, and/or PCF. For example, the new AMF 506 may invoke the Namf_Communication_RegistrationCompleteNotify service operation with the new AMF 506 including an indication of which particular PDU sessions cannot be served in the target RA, a cause value for autonomous UE's 502 SM context release, and the UP resources.

In certain embodiments, a seventh communication 534 (optional communication) between the new AMF 506 and the SMF 510 may be transmitted instead of the sixth communication 532. In such embodiments, the new AMF 506 is able to directly reach the SMF 510 from the network slice instance which is no longer available, therefore, the new AMF 506 notifies the SMF 510 that the UE's 502 SM context for the determined PDU sessions should be released. In some embodiments, the new AMF 506 may indicate to the SMF 510 whether the UE 502 is reachable (e.g., in the CM-CONNECTED state) so that the SMF 510 may perform explicit N1 SM exchange for PDU session release. If the UE 502 is in the CM-IDLE state (or due to other reasons such as a configuration that does not page the UE 502 in order to exchange N1 SM signaling), the new AMF 506 may indicate to the SMF 510 that the UE's 502 SM context may be autonomous and/or implicit released in the SMF 510 without N1 SM information exchange. If the seventh communication 534 is used, then the eighth communication 536 is not used and the ninth communication 538 is used. In various embodiments, the seventh communication 534 may be performed as: an N11 release SM request message (e.g., including: UE 502 ID, PDU session ID, release cause, and/or release type); Nsmf_PDUSession_UpdateSMContext (e.g., including: UE 502 ID, PDU session ID, and/or update type); and/or Nsmf_PDUSession_Release (e.g., including: UE 502 ID, PDU session ID, and/or release cause). In the above messages, the UE ID may be SUPI, for example. In certain embodiments, the parameter or informational element ("IE") "release cause," "release type," or "update type" may indicate either: autonomous release and/or delete of the UE's 502 context in the SMF 510, UPF 512, and/or PCF; or that explicit release (e.g., using N1 SM exchange for PDU session release) is possible. In certain embodiments, the seventh communication 534 may include a request and response message exchange with the old AMF 508. For example, the SMF 510 may respond to the old AMF 508 in response to the reception of the N11 release SM context request message and/or the deletion of the UE's 502 SM context. In such embodiments, the old AMF 508 may invoke an Nsmf_SMContext_Release service operation with the SMF 510 to release the UE's 502 SM context and the UP resources. In certain embodiments, if the UE 502 is in a CM-CONNECTED state, the new AMF 506 behavior and the SMF 510 behavior may be similar to the behavior described in the eighth communication 638. In various embodiments, the new AMF 506 may indicate whether the UE 502 is in a CM-IDLE or the CM-CONNECTED state. If the UE 502 is in the CN-CONNECTED state and the PDU session which is to be released is activated (e.g., user plane resources are activated), the RAN 504 may be informed to deactivate and/or release corresponding DRBs to the PDU session. In such embodiments, the SMF 510 may send an N2 SM resource release request (e.g., including a PDU session ID) to the RAN 504 via the new AMF 506. In some embodiments, autonomous and/or implicit PDU session release may mean omitting signaling from the SMF 510 to the RAN 504 (e.g., omitting the N2 SM resource release request to the RAN 504 via the new AMF 506).

In some embodiments, an eighth communication 536 between the old AMF 508 and the SMF 510 may occur after the sixth communication 532. In certain embodiments, based on the received unavailable S-NSSAI or PDU session ID for autonomous and/or implicit release, the old AMF 508 may determine to initiate release of N11 association and corresponding PDU sessions context in the network. In such embodiments, the old AMF 508 may initiate an N11 release SM context procedure towards the corresponding SMF 510 indicating that the PDU sessions should be released without sending N1 SM information to the UE 502 (e.g., to send PDU session release request or PDU session release command). In certain embodiments, this may mean that the SMF 510 autonomously releases the UE 502 SM context. For example, in various embodiments, the eighth communication 536 may be performed by the interface messages or services as described in the examples in the seventh communication 534. In some embodiments, the eighth communication 536 may include a request and response message exchange. For example, the SMF 510 may respond to the old AMF 508 in response to the reception of the N11 release SM context request message and/or the deletion of the UE's 502 SM context. In such embodiments, the old AMF 509 may invoke an Nsmf_SMContext_Release service operation with the SMF 510 to release the UE's 502 SM context and the UP resources.

In various embodiments, a ninth communication 538 between the SMF 510 and the UPF 512 may include the SMF 510 (or SMFs) initiating release of the N4 association with the UPF 512 (or UPFs) which was used for the PDU sessions indicated by the old AMF 508. In certain embodiments, this may include an N4 release procedure in order to delete the UE 502 states in the UPF 512 (e.g., allocated IP address and/or prefixes). In some embodiments, if there is an established session (e.g., IP connectivity access network "IP-CAN" session) between the SMF 510 and PCF, the SMF 510 may release this session with the PCF. In various embodiments, the SMF 510 may respond to the old AMF 508 to confirm the reception of the N11 release SM context request message and/or to confirm the completion of the implicit PDU session release procedure.

In certain embodiments, a tenth communication 540 (optional communication) transmitted from the old AMF 508 to the new AMF 506 may include the old AMF 508 confirming to the new AMF 506 that the PDU sessions corresponding to the unavailable S-NSSAI from either the sixth communication 532 or seventh communication 534 has been released in the old RA. In various embodiments, the old AMF 508 may include an indication of unavailable S-NSSAI and/or PDU session ID in a notify acknowledge message of the tenth communication 540. In some embodiments, the notify acknowledge message may be a slice release response (e.g., including unavailable S-NSSAI and/or cause value). The cause value, in certain embodiments, may indicate success or completion of the request from either the sixth communication 532 or seventh communication 534.

In some embodiments, an eleventh communication 542 between the new AMF 506 and the UDM 516 may include the new AMF 506 performing an update location procedure.

In various embodiments, a twelfth communication 544 transmitted from the UDM 516 to the old AMF 508 may include the UDM 516 performing a cancel location procedure with the old AMF 508 in order to delete the UE's 502 context in the old AMF 508.

In certain embodiments, a thirteenth communication 546 transmitted from the new AMF 506 to the UE 502 may include the new AMF 506 sending a registration accept message to the UE 502 including: mobility parameters, a tracking area identifier ("TAI") list, allowed NSSAI, available NSSAI (or rejected S-NSSAI), and/or PDU session status. In various embodiments, the "PDU session status" may indicate to the UE 502 which PDU sessions are established in the network and/or which PDU sessions are activated. In certain embodiments, the UE 502 removes locally any internal resources related to PDU sessions that are not marked as established in the received PDU session status. In some embodiments, if slice coexistence rules are not met by the S-NSSAI from the requested NSSAI, the serving PLMN (e.g. AMF) may include a registration accept message. The registration accept message may include: an error indication that incompatible S-NSSAIs were included in the requested NSSAI; network slices coexistence information for each one of the subscribed S-NSSAIs in the PLMN; available S-NSSAIs identifying the network slices permitted by the serving PLMN for the current RA; and/or which S-NSSAIs are not possible to access using the new AMF 506, but are possible to access in the current RA via another AMF.

In some embodiments, the UE 502 may release 548 one or more PDU sessions. In certain embodiments, if the PDU session status does not include one or more PDU session ID which are established in the UE 502, the UE 502 may internally (e.g., implicitly) remove the PDU session context for these PDU sessions. Depending on further information about the allowed NSSAI or available NSSAI, the UE 502 may determine whether to initiate new PDU session establishment procedures with the same or different S-NSSAIs in order to allow connectivity for the applications using the released PDU sessions.

In various embodiments, a fourteenth communication 550 (optional communication) transmitted from the UE 502 to the new AMF 506 may include the UE 502 sending a registration complete message to the new AMF 506 (e.g., to confirm the reception of the GUTI change and the allowed NSSAIs).

In certain embodiments, the UE 502 may establish 552 new or modify existing PDU sessions. In some embodiments, the UE 502 may initiate a new PDU session establishment procedure and/or a PDU session modification over available slices.

As used herein, "N1 SM information" is one description for the messages or information exchanged between the SMF 510 and UE 502. In some embodiments, the N1 SM information is sent transparently via the new AMF 506 and the RAN 504 encapsulated in NAS messages between the UE 502 and new AMF 506. For example, the N1 SM information may be a PDU session release request message or a PDU session release command message.

As may be appreciated, FIG. 5 shows only dedicated CN entities which are not available in the new RA. However, network slice entities from other network slices are not shown, but such entities are available and the new AMF 506 also interacts with those entities to update the N11 association with the new AMF 506.

Figure 6:
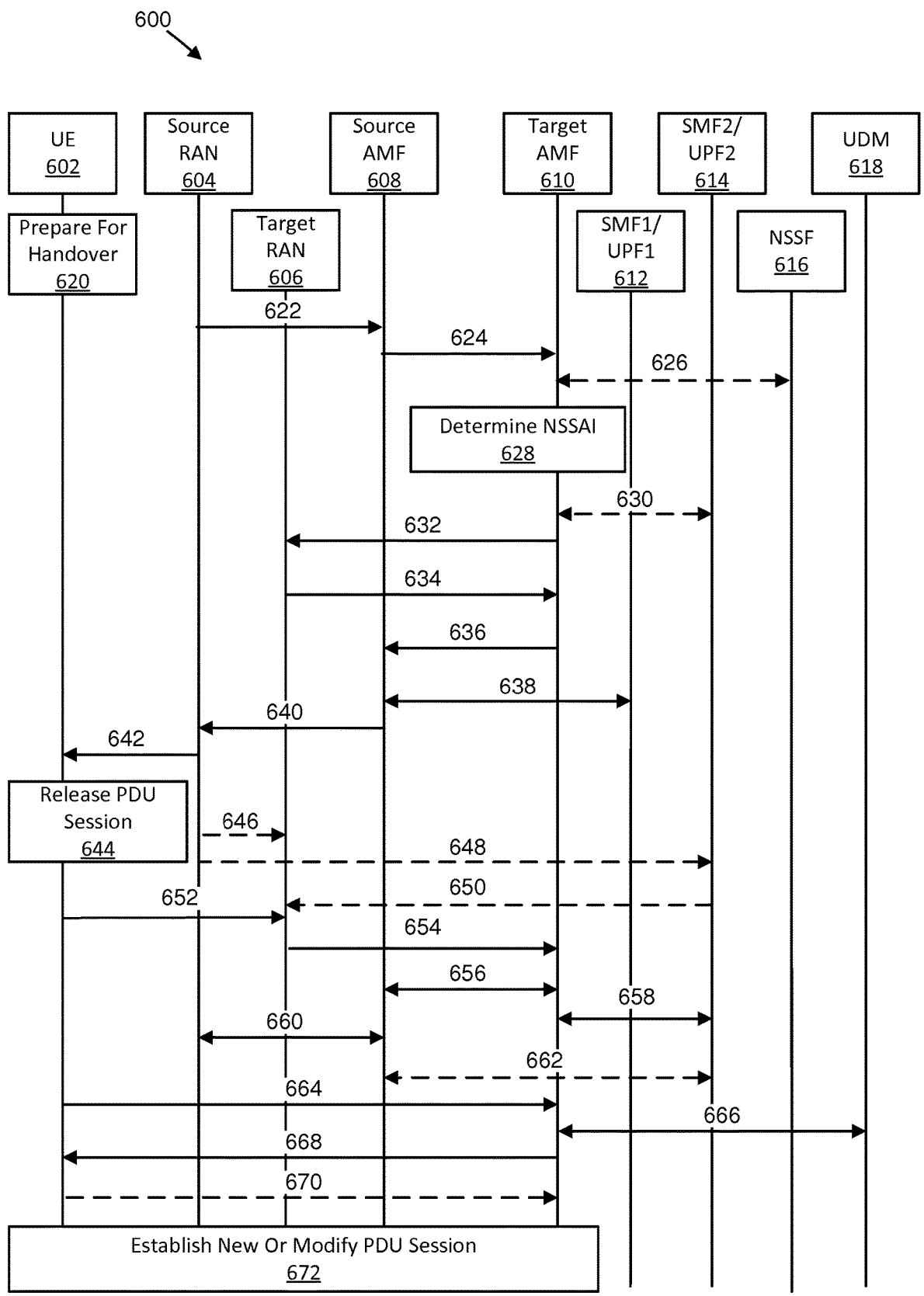
FIG. 6 is a schematic block diagram illustrating another embodiment of communications to facilitate indicating packet data unit sessions as unavailable.

FIG. 6 is a schematic block diagram illustrating another embodiment of communications 600 to facilitate indicating packet data unit sessions as unavailable.

FIG. 6 shows a particular example of how method described herein may be applied to a UE in a CM-CONNECTED state performing handover and/or registration procedures due to mobility. In certain embodiments, it may be assumed that an N2-based handover procedure with AMF change is used. Furthermore, in some embodiments, it may be assumed that SMF1/UPF1 belong to a network slice instance which is not available in the target cell (e.g., which is served by a target RAN ("T-RAN") and possibly in a new RA), while other network slice instances (e.g., as shown by SMF2/UPF2) are available in both an old RA and the new RA.

The communications 600 include communication between a UE 602, a source RAN 604, a target RAN 606, a source AMF 608, a target AMF 610, an SMF1/UPF1 612, an SMF2/UPF2 614, an NSSF 616, and a UDM 618. However, in other embodiments, the communications may be between different devices.

In various embodiments, the UE 602 may prepare 620 for handover and perform part of the handover execution procedure. In certain embodiments, even if a direct interface between the source RAN 604 and the target RAN 606 is available (e.g., an X2 and/or Xn interface) the source RAN 604 may determine to perform an N2-based handover. In various embodiments, the target RAN 606 and/or the source RAN 604 may determine that not all network slice instances (e.g., characterized by S-NSSAI) are served in the target cell. In such embodiments, instead of an X2 handover and/or an Xn handover, the source RAN 604 may determine to perform an N2-based handover.

In certain embodiments, a first communication 622 transmitted from the source RAN 604 to the source AMF 608 may include the source RAN 604 sending a handover required message to the source AMF 608. In various embodiments, the handover required message may include: a source to target transparent container; the target RAN 606 ID; a target RA code (e.g., from the target RAN 606); a direct forwarding flag; and/or a RAN cause.

In some embodiments, a second communication 624 may be transmitted from the source AMF 608 to the target AMF 610. In certain embodiments, the source AMF 608 may select the target AMF 610 based on an RA code of the target RAN 606 and based on the allowed NSSAI configured in the UE 602 in the old (source) RA. In various embodiments, as part of the second communication 624, the source AMF 608 may send a relocation request message (e.g., the message may include source AMF 608 UE MM context (allowed NSSAI, PDU session IDs, SMF IDs, etc.), UE 602 session and/or SMF context, a source to target transparent container, a RAN cause, the target RAN 606 ID, a target RA code, and/or a direct forwarding flag).

In various embodiments, a third communication 626 (optional communication) may occur between the target AMF 610 and the NSSF 616. In certain embodiments, the target AMF 610 may determine based on an internal configuration or based on interaction with the NSSF 616 whether the target AMF 610 may serve all S-NSSAI from the allowed NSSAI and which NSi to use for each S-NSSAI. In one embodiment, if the target AMF 610 determines that for one or more S-NSSAI from the allowed NSSAI there is no corresponding available NSi in the current area, the target AMF 610 may consider this during the derivation of allowed NSSAI for the target RA.

In some embodiments, the target AMF 610 may determine 628 NSSAI. In certain embodiments, the target AMF 610 may determine 628 the allowed NSSAI in the target RA. In various embodiments, in case of unavailable S-NSSAI from the old (source RA), the allowed NSSAI may include a subset of the allowed NSSAI in the old RA. In some embodiments, in order to determine the allowed NSSAI in the new RA, the target AMF may perform communication 528 as described in relation to FIG. 5 to check with NSSF about a more appropriate AMF and available network slice instances ("NSIs") in the area. In one example, the target AMF 610 may determine that a particular S-NSSAI used in the old RA is unavailable in the new RA. In various embodiments, the target AMF 610 may identify corresponding PDU sessions and corresponding SMFs. In one embodiment, the target AMF 610 may be able to determine the reachability of SMFs of the unavailable S-NSSAI (e.g., network slice instance cannot be used). In some embodiments, the target AMF 610 may determine that the target AMF 610 cannot reach SMF1/UPF1 612.

In certain embodiments, a fourth communication 630 (optional communication) may be between the target AMF 610 and the SMF2/UPF2 614. In one embodiment, the target AMF 610 may determine whether an SMF change is needed for the supported S-NSSAIs in the new RA. In various embodiments, the target AMF 610 may determine that the SMF2/UPF2 614 for the existing PDU session may be further used. In such embodiments, the target AMF 610 may perform a PDU handover request and/or response exchange towards the SMF2/UPF2 614. In some embodiments, the SMF2/UPF2 614 may determine whether a UPF change is needed and may execute the UPF change.

In some embodiments, a fifth communication 632 transmitted from the target AMF 610 to the target RAN 606 may include the target AMF 610 sending a handover request message to the target RAN 606. In certain embodiments, the handover request message may include N2 information, aggregate maximum bit rate ("AMBR") (which can be for the UE 602 and/or per access point name "APN"), an S1 application protocol ("AP") cause, a source to target transparent container, and/or a handover restriction list. In one embodiment, the handover request message may create the UE 602 context in the target RAN 606 including information about the PDU sessions (e.g., data radio bearers) and the security context. In some embodiments, for each PDU session, there may be UPF N3 tunnel information (e.g., tunnel endpoint ID ("TEID") for uplink N3), and PDU session QoS parameters. In such embodiments, if the direct forwarding flag indicates unavailability of direct forwarding and the target AMF 610 knows that there is no indirect data forwarding connectivity between the source AMF 608 and the target AMF 610, the PDU session information may include an indication of "data forwarding not possible" for each PDU session. In some embodiments, if the target AMF 610 determines that some S-NSSAIs are unavailable in the new RA, the target AMF 610 may include allowed NSSAI in the N2 message to the target RAN 606 (e.g., handover request message). In various embodiments, the target AMF 610 may indicate to the target RAN 606 that the allowed NSSAI may be different from the RAN context in a source to target transparent container. In certain embodiments, the source to target transparent container may include AS context for all activated UP resources. In one embodiment, the target AMF 610 may not process the content of this RAN container. In various embodiments, other means are used to instruct the target RAN 606 that if the RAN container contains AS and/or UP context for bearers belonging to network slices (or PDU Sessions) which are not available in the target cell (or area), the target RAN 606 may not reserve (or assign) AS and/or UP resources for those bearers. In such embodiments, the target AMF 610 may include a new indication to the target RAN 606 indicating that the AS and/or UP context from the source RAN 604 differs from the allowed NSSAI in the target RA. For example, a new parameter or IE may be specified for this purpose.

In various embodiments, a sixth communication 634 transmitted from the target RAN 606 to the target AMF 610 may include the target RAN 606 confirming the reception and processing of the handover request message. In some embodiments, if the new parameter or IE from the target RAN 606 for allowed NSSAI differs from AS context (or allowed NSSAI) in the source RAN 604 has been received, the target RAN 606 may not consider establishing AS context for the bearers (e.g., data radio bearers "DRBs") from the source to target transparent container for which there is no matching to the S-NSSAI from the allowed NSSAI received from the target AMF 610. In certain embodiments, the target RAN 606 may generate a target to source transparent container which may be sent to the source RAN 604. In various embodiments, the target RAN 606 may consider during the generation of the target to source transparent container to include an indication to the source RAN 604 of which PDU sessions (e.g., which DRBs) may not be supported and/or established in the target cell. In such embodiments, the target RAN 606 may include in the target to source transparent container only information about the DRBs which will be established (e.g., based on the allowed NSSAI information received from the target AMF 610).

In certain embodiments, a seventh communication 636 transmitted from the target AMF 610 to the source AMF 608 may include the target AMF 610 responding to the source AMF 608 with a relocation response message. The relocation response message may include a cause, a target to source transparent container, an SMF change indication, accepted PDU sessions, UP addresses, and/or TEIDs (e.g., N3, Xn, and/or X2 tunnel information). In various embodiments, if the target AMF 610 determines that the SMFs of the unavailable S-NSSAI are not reachable, then the target AMF 610 may include, in the relocation response message, an indication about the unavailable S-NSSAI (or optionally the related PDU session IDs). In one embodiment, the unavailable S-NSSAI indication may mean to the source AMF 608 that the target AMF 610 cannot reach the related SMFs with direct signaling.

In some embodiments, an eighth communication 638 may be made between the source AMF 608 and the SMF1/UPF1 612. In certain embodiments, if the target AMF 610 has included an indication about unavailable S-NSSAI in the relocation response message, the source AMF 608 may initiate a release procedure in the eighth communication 638 transmitted to the SMF1/UPF1 612 serving the PDU sessions related to the unavailable S-NSSAI. In one embodiment, the source AMF 608 may determine the PDU sessions which should be implicitly released (e.g., released without N1 SM information signaling towards the UE 602). In certain embodiments, the eighth communication 638 may include a request and/or a response message exchange. In some embodiments, the SMF1/UPF1 612 may respond to the source AMF 608 indicating the reception of the N11 release SM context request message and/or the deletion of the UE's 602 SM context. In certain embodiments, after receiving an indication for autonomous and/or implicit PDU session release, the SMF1/UPF1 612 may omit sending the N2 resource release request (e.g., including a PDU session ID) to the source RAN 608 over the source AMF 608. If the source AMF 608 hasn't indicated autonomous and/or implicit PDU session release, then the SMF1/UPF1 612 may send an N2 SM resource release request (e.g., including a PDU session ID) and N1 SM information (e.g., PDU session release command).

In various embodiments, a ninth communication 640 from the source AMF 608 to the source RAN 604 may include the source AMF 608 sending a handover command message to the source RAN 604. In such embodiments, the handover command message may include a target to source transparent container, PDU sessions subject to forwarding, and/or PDU sessions to release. In certain embodiments, the PDU sessions subject to forwarding includes a list of UP addresses and TEIDs allocated for forwarding. Moreover, in one embodiment, the PDU sessions to release includes the list of PDU sessions to be released. Furthermore, in some embodiments, the target to source transparent container may contain information included by the target RAN 606 which PDU sessions (e.g., which DRBs) may not be supported and/or established in the target cell. In various embodiments, the source RAN 604 may learn which sessions and/or DRBs may be supported at the target cell and may use this information for further processing.

In certain embodiments, a tenth communication 642 transmitted from the source RAN 604 to the UE 602 may include the source RAN 604 sending the handover command message to the UE 602. In one embodiment, the handover command message generated by the source RAN 604 may include information about the sessions and/or DRBs which may be established at the target cell (or target RAN 606). In some embodiments, when generating the handover command message, the source RAN 604 may consider the target to source transparent containe" generated and sent from the target RAN 606.

In various embodiments, the UE 602 may release 644 one or more PDU sessions. In certain embodiments, the UE 602 may determine which PDU sessions and corresponding to DRBs should be released base on the PDU sessions to release indication in the handover command message. In one embodiment, the PDU sessions (e.g., including context in the NAS layer and AS layer, i.e., DRBs) may be released autonomously in the UE 602.

In some embodiments, an eleventh communication 646 (optional communication) transmitted from the source RAN 604 to the target RAN 606 may include the source RAN 604 forwarding DL data towards the target RAN 606 for PDU sessions subject to data forwarding via direct forwarding.

In various embodiments, a twelfth communication 648 (optional communication) transmitted from the source RAN 604 to the SMF2/UPF2 614 and a thirteenth communication 650 (optional communication) transmitted from the SMF2/UPF2 614 to the target RAN 606 may include the source RAN 604 forwarding DL data towards the target RAN 606 for PDU sessions subject to data forwarding via indirect forwarding.

In various embodiments, a fourteenth communication 652 transmitted from the UE 602 to the target RAN 606 may include the UE 602 sending a handover confirm message to the target RAN 606. In certain embodiments, downlink packets forwarded from the source RAN 604 may be sent to the UE 602.

In some embodiments, a fifteenth communication 654 transmitted from the target RAN 606 to the target AMF 610 may include the target RAN 606 sending a handover notify message (e.g., including TAI plus E-UTRAN cell global identifier "ECGI" and/or local home network ID) to the target AMF 610.

In certain embodiments, a sixteenth communication 656 between the source AMF 608 and the target AMF 610 may include the target AMF 610 sending a relocation complete message to the source AMF 608. Moreover, in some embodiments, the source AMF 608 may, in response to receiving the relocation complete message, send a relocation complete acknowledge message to the target AMF 610.

In various embodiments, a seventeenth communication 658 between the target AMF 610 and the SMF2/UPF2 614 may include the target AMF 610 transmitting a PDU session modification procedure towards the UMF2/UPF2 614 for the PDU session associated with the S-NSSAIs from the allowed NSSAI (e.g., for the PDU sessions which are successfully handed over). For example, in one embodiment, the target AMF 610 may send to the SMF2/UPF2 614 a PDU session modification request message (e.g., UP target RAN 606 address and TEID allocated at the target RAN 606) for each PDU session.

In some embodiments, an eighteenth communication 660 between the source RAN 604 and the source AMF 608 may include the source AMF 608 performing a N2 context release procedure toward the source RAN 604. In various embodiments, the eighteenth communication 660 may be performed after a timer, which has been triggered after the sixteenth communication 656, has expired. In such embodiments, the timer may be a guard time to enable forwarding packets from the source RAN 604 to the target RAN 606 without losses.

In certain embodiments, a nineteenth communication 662 (optional communication) between the source AMF 608 and the SMF2/UPF2 614 may include deleting indirect forwarding.

In various embodiments, a twentieth communication 664 transmitted from the UE 602 to the target AMF 610, a twenty-first communication 666 between the target AMF 610 and the UDM 618, a twenty-second communication 668 transmitted from the target AMF 610 to the UE 602, and a twenty-third communication 670 (optional communication) transmitted from the UE 602 to the target AMF 610 may include a registration procedure due to the change of registration area. In certain embodiments, the UE 602 sends an NAS registration request message to the target AMF 610 due to mobility. The NAs registration request message may include a UE 602 ID, a registration type (e.g., Mobility type), and/or requested NSSAI. In some embodiments, the NAS registration request message may be transmitted via RRC signaling. In one embodiment, during the registration procedure, allowed NSSAI may be assigned to the UE 602 for the new RA as described herein. In certain embodiments, the UE 602 may establish 672 new or modify existing PDU sessions.

In another embodiment, during a handover procedure the UE 602 in CM-CONNECTED state or the network (e.g., SMF) may initiate N1 SM signaling for any PDU session which cannot be used in the target RA. In various embodiments, registration signaling exchange may happen after the handover procedure is completed, so N1 SM signaling for the unavailable PDU session may fail if the signaling is performed during the handover procedure and before the UE 602 receives a registration accept message (e.g., carrying the new allowed NSSAI). In some embodiments, the UE 602 and the network (e.g., the serving AMF) may block the N1 SM signaling as long as the handover procedure with the new RA (and corresponding RM procedure) is completed. For example, at the UE 602 side, the NAS message carrying N1 SM information may not be processed by the RRC layer. In certain embodiments, the RRC layer may indicate to the NAS layer that the N1 SM information messages for any PDU session are temporary not possible to be transmitted. In various embodiments, after the reception of the registration accept message, the UE 602 (e.g., NAS registration management "RM" and/or MM layer) may be able to determine whether to continue with the transmission of the N1 SM information or to discard the message. As another example, at the network side, the AMF (e.g., the old AMF) receiving the N1 SM information from any SMF may determined that during the handover procedure the N1 SM information is temporary not sent to the UE 602. In one embodiment, the AMF may respond with the N11 message (carrying the N1 SM message to the UE 602) to the SMF indicating to the SMF that the N1 SM message temporarily cannot be transmitted. In such an embodiment, the SMF may wait for a particular time (based on timer) or wait until a new AMF performs a PDU session handover procedure.

Figure 7:
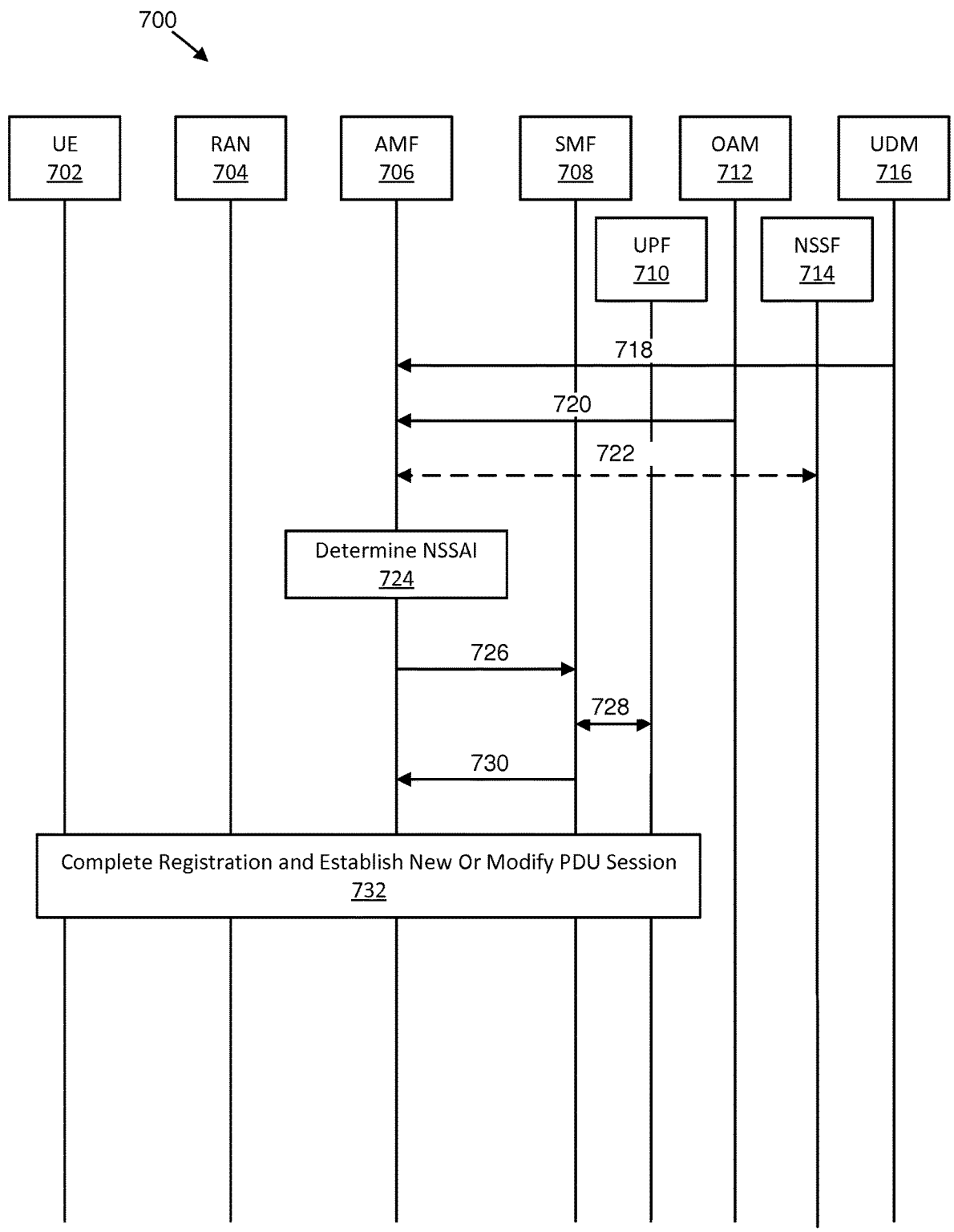
FIG. 7 is a schematic block diagram illustrating a further embodiment of communications to facilitate indicating packet data unit sessions as unavailable.

FIG. 7 is a schematic block diagram illustrating a further embodiment of communications 700 to facilitate indicating packet data unit sessions as unavailable. In various embodiments described in relation to FIG. 7, a change in a set of network slices for a particular UE 702 may be triggered by: a change of a user's subscription (and thus triggered by the UDM 716 and/or HSS); or a change of the network configuration (and thus triggered by the OAM system). In such embodiments, the UE 702 may not move, but the change of the set of network slices may happen due to other events (e.g., triggered by the UDM 716 and/or HSS or triggered by the OAM system).

The communications 700 include communication between a UE 702, a RAN 704, an AMF 706, an SMF 708, a UPF 710, an OAM 712, an NSSF 714, and a UDM 716. However, in other embodiments, the communications may be between different devices.

In certain embodiments, a first communication 718 transmitted from the UDM 716 to the AMF 706 may include information used to trigger a UE 702 subscription update in response to a change in a network configuration. In some embodiments, the information may include a parameter (e.g., time guard) used to indicate when the subscription update should be performed (e.g., immediately, at a predetermined time, starting at a selected time and/or date).

In some embodiments, a second communication 720 transmitted from the OAM 712 to the AMF 706 may include information used to trigger a UE 702 subscription update in response to a change in a user's subscription. In various embodiments, the OAM 712 may determine to turn off a network slice instance. In some embodiments, the information may include a parameter (e.g., time guard) used to indicate when the subscription update should be performed (e.g., immediately, at a predetermined time, starting at a selected time and/or date).

In various embodiments, a third communication 722 (optional communication) may occur between the AMF 706 and the NSSF 714. In some embodiments, the third communication 722 may include information similar to the fifth communication 528.

In certain embodiments, the AMF 706 may determine 724 NSSAI. In various embodiments, the AMF 706 may determine 724 (based on existing UE context, internal configuration, and/or on information exchanged with the NSSF) that for one or more S-NSSAI from the requested NSSAI there is no corresponding available NSi. In some embodiments, the reason for unavailable NSi may be: NSi unavailable in the new registration area; the slice (characterize by the S-NSSAI) is available in the new registration area, but require a different AMF (meaning that some S-NSSAIs of the Requested NSSAI are not co-existing); or the S-NSSAI is not available at this time of day, etc. In certain embodiments, a particular S-NSSAI may be temporary rejected. In various embodiments, the AMF 706 may determine the allowed NSSAI in the current registration area. In such embodiments, the allowed NSSAI may include a subset of the allowed NSSAI in the old registration area. Moreover, the AMF 706 may compare the allowed NSSAI in the new RA with the S-NSSAIs (and corresponding PDU Sessions) used in the old RA. In some embodiments, if the AMF 706 determines that one or more of the S-NSSAIs used in the old RA are not available in the new RA, the AMF 706 may initiate signaling to indicate autonomous release of UE's SM context in the corresponding SMFs.

In various embodiments, a fourth communication 726 may be transmitted from the AMF 706 to the SMF 708. In some embodiments, the fourth communication 726 may include information similar to the seventh communication 534. In certain embodiments, the fourth communication 726 may include part of a request from the AMF 706 to the SMF 708. In various embodiments, the AMF 706 may be able to contact the SMF 708 (e.g., assuming that a guard time described in the first communication 718 and/or the second communication 720 available). In such embodiments, the AMF 706 does not need to determine whether the SMF 708 (or SMFs) serving the established PDU sessions is reachable, as it is implicitly assumed that the SMF 708 is reachable (at least for the time indicated the first communication 718 and/or the second communication 720). In some embodiments, the AMF 706 may determine the indication for autonomous release or explicit release of the PDU sessions based on the connection management ("CM") state of the UE 702 (e.g., whether the UE 702 is in CM-IDLE state or CM-CONNECTED state). For example, if the UE 702 is in CM-IDLE state, the AMF 706 may determine to initiate autonomous and/or implicit PDU session release. In contrast, if the UE 702 is in CM-CONNECTED state, the AMF 706 may determine to initiate PDU session release. In various embodiments, the exchange of explicit N1 SM signaling may not result in additional signaling like paging and/or service request procedures.

In certain embodiments, a fifth communication 728 between the SMF 708 and the UPF 710 may be similar to the ninth communication 538.

In some embodiments, a sixth communication 730 transmitted from the SMF 708 to the AMF 706 may be similar to the seventh communication 534. In various embodiments, the sixth communication 730 may only include information transmitted from the SMF 708 to the AMF 706.

In certain embodiments, the UE 702 may complete 732 registration and establish new and/or modify existing PDU sessions. In some embodiments, the UE 702 may initiate a new PDU session establishment procedure and/or a PDU session modification over available slices. In various embodiments, the UE 702 may complete 732 the registration using communications similar to the thirteenth communication 546 and the fourteenth communication 550. Moreover, the UE 702 may release one or more PDU sessions similarly to the release 548.

Figure 8:
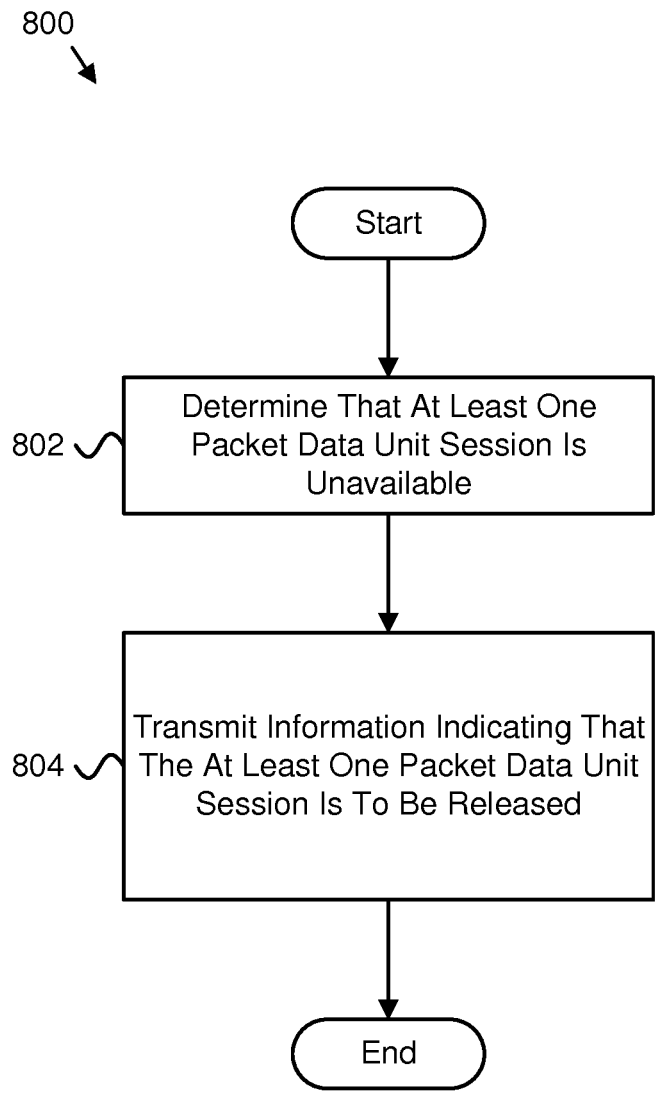
FIG. 8 is a schematic flow chart diagram illustrating one embodiment of a method for indicating packet data unit sessions as unavailable.

FIG. 8 is a schematic flow chart diagram illustrating one embodiment of a method 800 for indicating packet data unit sessions as unavailable. In some embodiments, the method 800 is performed by an apparatus, such as the network function 106 (e.g., AMF). In certain embodiments, the method 800 may be performed by a processor executing program code, for example, a microcontroller, a microprocessor, a CPU, a GPU, an auxiliary processing unit, a FPGA, or the like.

The method 800 may include determining 802 that at least one packet data unit session is unavailable. In various embodiments, the method 800 includes transmitting 804 information indicating that the at least one packet data unit session is to be released.

In one embodiment, the method 800 includes determining whether a network function is able to communicate with a session management function used for the at least one packet data unit session. In a further embodiment, the method 800 includes, in response to determining that the network function is able to communicate with the session management function, transmitting the information indicating that the at least one packet data unit session is to be released, and the information indicates to release the at least one packet data unit session. In certain embodiments, the information indicates that the at least one packet data unit session is to be released without notifying a corresponding remote unit. In various embodiments, the information indicates that the at least one packet data unit session is to be released with notification given to a corresponding remote unit. In some embodiments, the method 800 includes, in response to determining that the network function is unable to communicate with the session management function, transmitting the information indicating that the at least one packet data unit session is unavailable to a prior network function. In certain embodiments, the information indicates an identification of the at least one packet data unit session.

In various embodiments, the information indicates that the prior network function is to release the at least one packet data unit session. In some embodiments, the prior network function determines based on the information whether to initiate release of the at least one packet data unit session. In certain embodiments, the prior network function communicates with the session management function to release the at least one packet data unit session, and the at least one packet data unit session is released without providing notification to a remote unit corresponding to the at least one packet data unit session. In one embodiment, the method 800 includes receiving feedback indicating that the prior network function released the at least one packet data unit session. In various embodiments, the method 800 includes transmitting a message to a remote unit indicating enabled network slice selection assistance information. In some embodiments, the method 800 includes transmitting a message to a remote unit indicating available packet data unit sessions.

Figure 9:
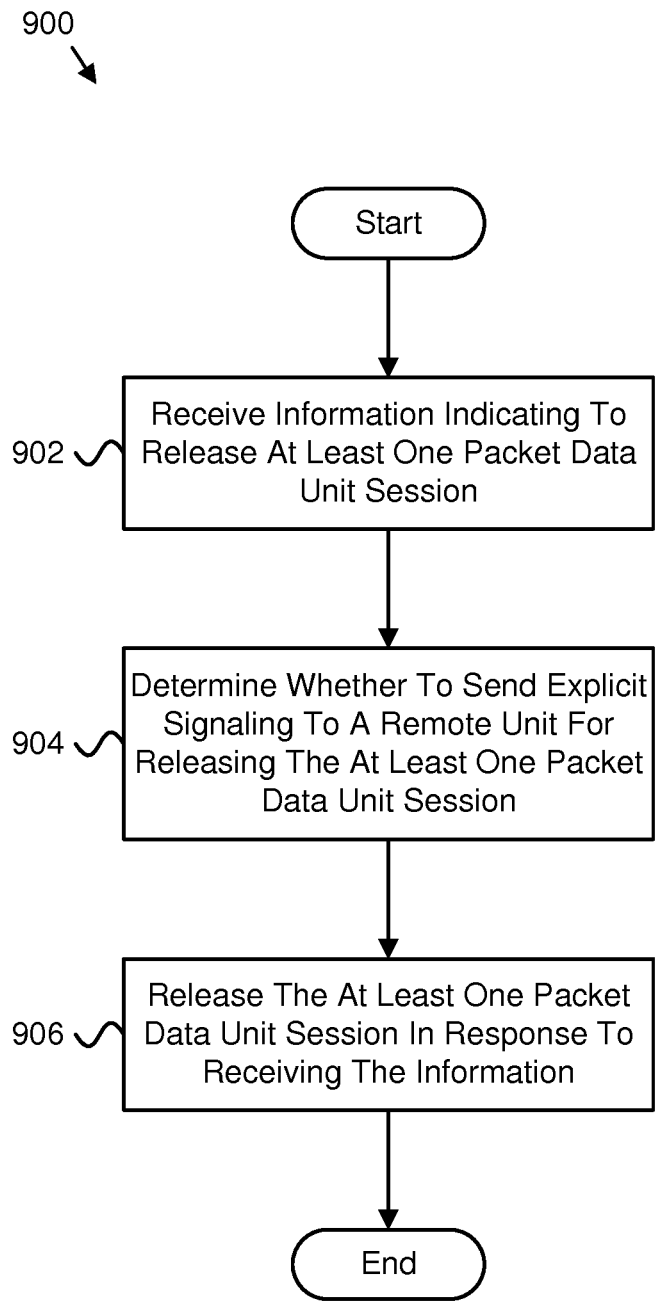
FIG. 9 is a schematic flow chart diagram illustrating another embodiment of a method for indicating packet data unit sessions as unavailable.

FIG. 9 is a schematic flow chart diagram illustrating one embodiment of a method 900 for indicating packet data unit sessions as unavailable. In some embodiments, the method 900 is performed by an apparatus, such as the network function 106 (e.g., SMF). In certain embodiments, the method 900 may be performed by a processor executing program code, for example, a microcontroller, a microprocessor, a CPU, a GPU, an auxiliary processing unit, a FPGA, or the like.

The method 900 may include receiving 902 information indicating to release at least one packet data unit session. In various embodiments, the method 900 includes determining 904 whether to send explicit signaling to a remote unit for releasing the at least one packet data unit session. In certain embodiments, the method 900 includes releasing 906 the at least one packet data unit session in response to receiving the information.

In one embodiment, the method 900 includes transmitting feedback indicating that the at least one packet data unit session is released. In a further embodiment, the method 900 includes transmitting a message to the remote unit indicating that the at least one packet data unit session is released.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining that at least one network slice used for a packet data unit session is unavailable;
   transmitting information to a session management function or a first mobility management function indicating that the packet data unit session is to be released; and
   transmitting a message to a remote unit indicating allowed network slices as a result of determining that the at least one network slice used for the packet data unit session is unavailable.

2. The method of claim 1, wherein transmitting the information to the first mobility management function comprises determining that the remote unit has moved to a second mobility management function.

3. The method of claim 1, wherein transmitting the information to the session management function comprises determining that the remote unit is served by the first mobility management function.

4. The method of claim 1, wherein the information indicates that the packet data unit session is to be released without notifying a corresponding remote unit.

5. The method of claim 1, wherein the information indicates that the packet data unit session is to be released with notification given to a corresponding remote unit.

6. The method of claim 2, wherein the information indicates that the first mobility management function is to release the packet data unit session.

7. The method of claim 2, wherein the first mobility management function determines based on the information whether to initiate release of the packet data unit session, the first mobility management function communicates with the session management function to release the packet data unit session, and the packet data unit session is released without providing notification to a remote unit corresponding to the packet data unit session.

8. The method of claim 1, further comprising receiving feedback indicating that the first mobility management function released the packet data unit session.

9. The method of claim 1, wherein the message to the remote unit further indicates a modified packet data unit session status.

10. The method of claim 9, wherein the remote unit locally releases a packet data unit session context after receiving the packet data unit session status.

11. An apparatus comprising:
a processor that determines that at least one network slice used for a packet data unit session is unavailable; and
a transmitter that:
  transmits information to a session management function or a first mobility management function indicating that the packet data unit session is to be released; and
  transmits a message to a remote unit indicating allowed network slices as a result of determining that the at least one network slice used for the packet data unit session is unavailable.

12. The apparatus of claim 11, wherein the transmitter transmitting the information to the first mobility management function comprises the processor determining that the remote unit has moved to a second mobility management function.

13. The apparatus of claim 11, wherein the transmitter transmitting the information to the session management function comprises determining that the remote unit is served by the first mobility management function.

14. The apparatus of claim 11, wherein the information indicates that the packet data unit session is to be released without notifying a corresponding remote unit.

15. The apparatus of claim 11, wherein the information indicates that the packet data unit session is to be released with notification given to a corresponding remote unit.

16. The apparatus of claim 12, wherein the information indicates that the first mobility management function is to release the packet data unit session.

17. The apparatus of claim 12, wherein the first mobility management function determines based on the information whether to initiate release of the packet data unit session, the first mobility management function communicates with the session management function to release the packet data unit session, and the packet data unit session is released without providing notification to a remote unit corresponding to the packet data unit session.

18. The apparatus of claim 11, further comprising a receiver that receives feedback indicating that the first mobility management function released the packet data unit session.

19. The apparatus of claim 11, wherein the message to the remote unit further indicates a modified packet data unit session status.

20. The apparatus of claim 19, wherein the remote unit locally releases a packet data unit session context after receiving the packet data unit session status.

* * * * *